Jan. 27, 1953    M. A. TOWNSEND    2,627,053
COLD CATHODE GASEOUS DISCHARGE
DEVICES AND CIRCUITS THEREFOR
Filed Nov. 1, 1951    5 Sheets-Sheet 1
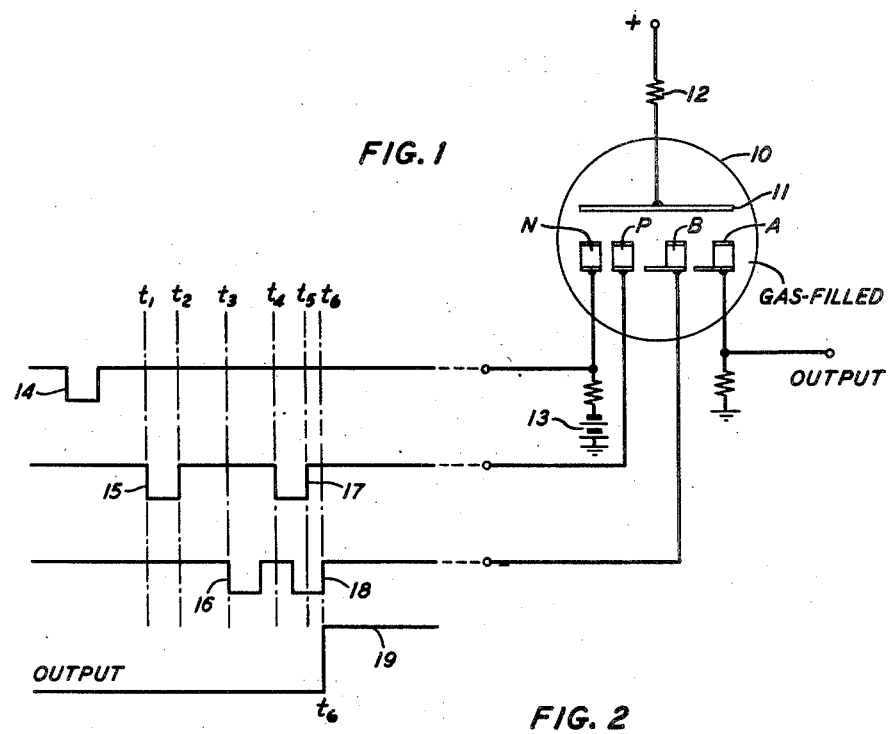
INVENTOR
M. A. TOWNSEND
BY
ATTORNEY Jan. 27, 1953  M. A. TOWNSEND  2,627,053
COLD CATHODE GASEOUS DISCHARGE
DEVICES AND CIRCUITS THEREFOR
Filed Nov. 1, 1951  5 Sheets-Sheet 2

INVENTOR
M. A. TOWNSEND
BY
ATTORNEY

Jan. 27, 1953     M. A. TOWNSEND     2,627,053
COLD CATHODE GASEOUS DISCHARGE
DEVICES AND CIRCUITS THEREFOR

Filed Nov. 1, 1951     5 Sheets-Sheet 3

INVENTOR
M. A. TOWNSEND
BY
ATTORNEY

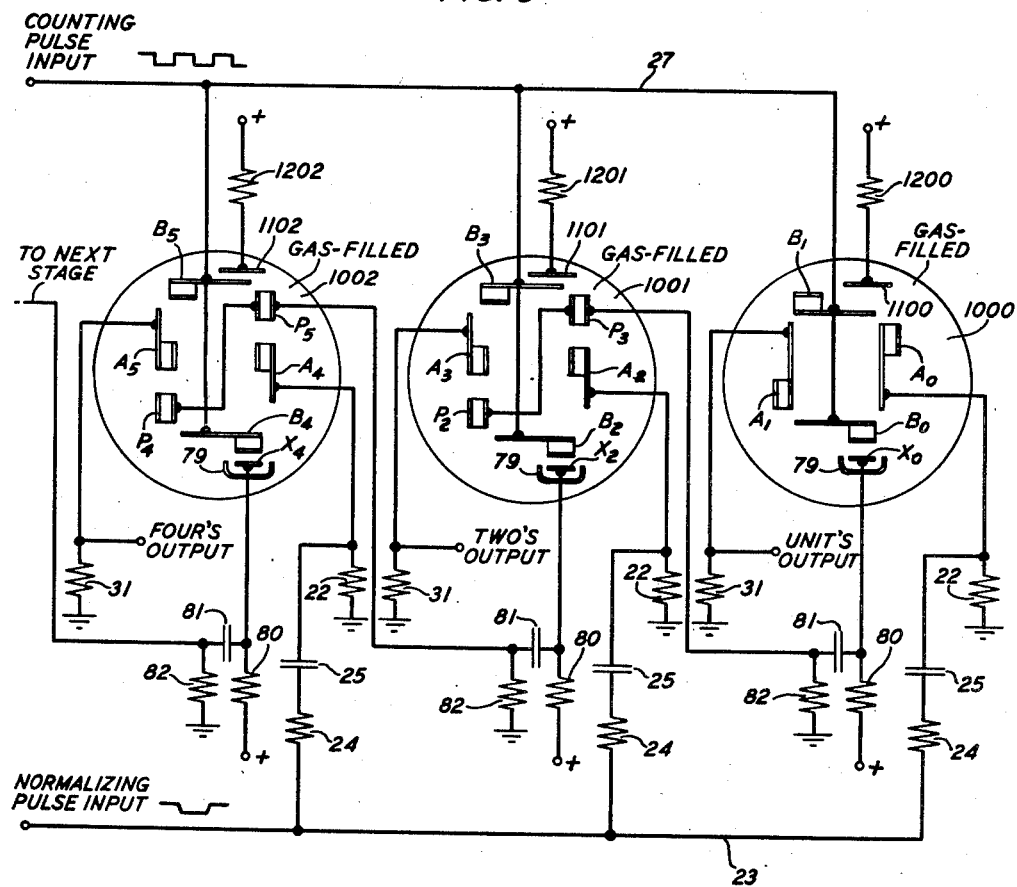

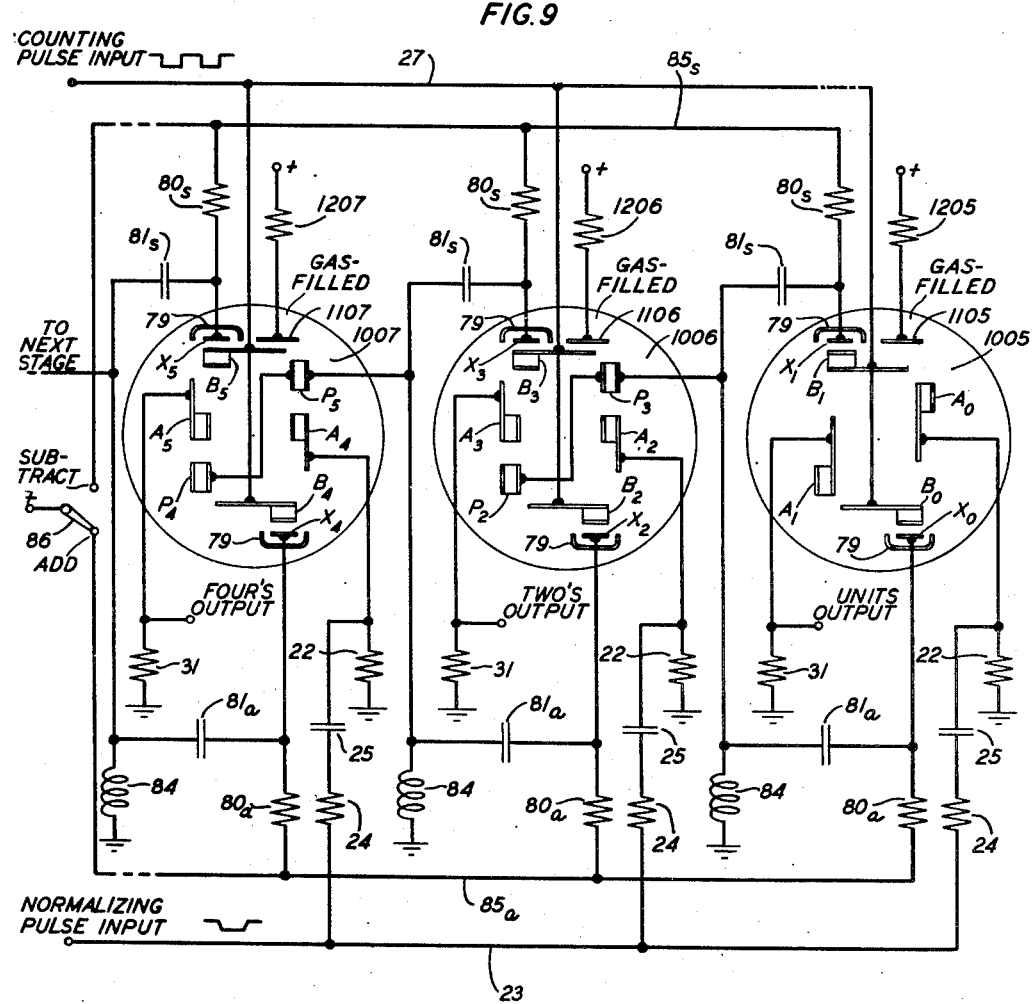

Patented Jan. 27, 1953

2,627,053

UNITED STATES PATENT OFFICE 2,627,053

COLD CATHODE GASEOUS DISCHARGE DEVICES AND CIRCUITS THEREFOR

Mark A. Townsend, Berkeley Heights, N. J., assignor to Bell Telephone Laboratories, Incorporated, New York, N. Y., a corporation of New York Application November 1, 1951, Serial No. 254,327

29 Claims. (Cl. 315—168)

This invention relates to cold cathode gaseous discharge devices and more particularly to multiple cathode devices and circuits especially suitable for switching or pulse counting apparatus and systems.

In computing and switching systems the recognition of the coincidence of two signals and the counting of signals or pulses on a binary basis are important functions. Circuits employing chains of relays, thermionic vacuum tubes, or chains of cold cathode or hot cathode gas tubes have priorly been proposed to achieve these functions. These chains, however, tend to be cumbersome, complex, and, particularly with respect to chains or relays, relatively slow. When reversible binary counting chains are desired these complexities are further multiplied.

Further in most of these chains, as in cold cathode stepping tubes of a large number of stages, the signal pulse from one stage is employed to drive the next stage, which causes a degeneration of the signal in successive stages. In counting chains employing thermionic vacuum tubes, this may be avoided as each tube can amplify the signal, thereby preventing degeneration, but such chains are cumbersome and require an excessive number of individual tubes.

It is therefore one object of this invention to enable facile recognition of the coincidence of two signals or pulses.

It is a further object of this invention to facilitate counting on a binary basis, both simple counting and reversible counting. It is thus an object of this invention to enable the counting of pulses both additively and subtractively.

It is a still further object of this invention to attain binary counting without degeneration of the signal in successive stages of the counting.

It is a further object of this invention to provide an improved multicathode tube utilizable both for recognition of the coincidence of signals or pulses and for counting on a binary basis.

It is a still further object of this invention to provide an improved preference cathode having portions of different discharge efficiency to enable transfer of the discharge in a preferred direction. More specifically, it is an object of this invention to provide an improved preference cathode that can be fabricated facilely and economically on a mass production basis.

Certain of these and other objects of this invention are achieved in accordance with this invention by the provision of a priming cathode, which is not preferential, adjacent a transfer cathode, which is preferential, so that the discharge can be transferred by the priming and transfer cathodes only on the coincidence of signals applied to both of the cathodes. Advantageously, the priming cathode is positioned before the transfer cathode so that the discharge must be transferred to it first. Then if the conditions are such that only either one of the priming and transfer cathodes has a signal applied thereto, but not both, the discharge will be left, after the disappearance of the signal, where it was initially.

Further, these and other objects are achieved in accordance with one specific embodiment of this invention in which the transfer of a discharge in a first tube in a counting chain causes a signal to be applied to priming cathodes in a second tube in the counting chain, so that the glow discharge in that second tube is transferred upon the coincidence of a signal to the non-directional priming cathodes and a signal to the directional transfer cathodes. In one specific embodiment of this invention, the priming, transfer, and rest cathodes of the devices in a counting chain are so connected that binary addition is attained on the application of signal pulses to the counting chain. In another specific illustrative embodiment of this invention, the application of signal pulses causes binary subtraction and in still another illustrative embodiment either addition or subtraction depending on the determination of a single switch.

One specific illustrative gaseous discharge device in accordance with this invention that is employable in circuits for both binary subtraction and binary addition comprises a first preference rest cathode, a first non-preference priming cathode, a first pair of preference transfer cathodes, a second preference rest cathode, a second non-preference priming cathode, and a second pair of preference transfer cathodes arranged adjacent an anode and cooperating therewith to form a closed continuous stepping chain. The cathodes of this device in accordance with a feature of this invention may advantageously be each formed of a single wire, the preference cathodes comprising a single wire wound into a hollow helical section defining the portion of high discharge efficiency and having one end of the wire extending away therefrom defining the portion of low discharge efficiency, and the non-preference cathodes having only the wound hollow helical section.

It is therefore one feature of this invention that a non-preference priming cathode be positioned together with a preference transfer cathode between a first cathode and a preference rest cathode for the transfer of a discharge from the first cathode to the rest cathode only upon the coincidence of signals to both the priming and transfer cathodes.

It is another feature of this invention that a gaseous discharge device comprise a closed array of a first priming cathode, a first transfer cathode, a first rest cathode, a second priming cathode, a second transfer cathode, and a second rest cathode arranged in that order forming a continuous stepping chain. More specifically it is a feature of this invention that each of the transfer and rest cathodes be preference cathodes but that the priming cathodes be non-preference cathodes.

It is still another feature of this invention that a circuit for binary counting include gaseous stepping devices having each a pair of priming, transfer, and rest cathodes arranged in accordance with this invention and means for applying a priming pulse to the priming cathodes of one of these devices upon the transfer of the discharge in the prior device in the circuit by a particular one of the transfer cathodes therein. More specifically, it is a feature of one illustrative embodiment of this invention that each of the transfer cathodes be independently connected to a pulse input lead but that one transfer cathode of each device be connected through the primary winding of a transformer, the secondary of which is connected to the priming cathodes of the next device in the circuit. And more specifically it is a feature of another illustrative embodiment of this invention that the transfer cathodes be jointly connected to a pulse input lead and that an auxiliary anode be adjacent one of the transfer cathodes and capable of preferably sustaining a discharge to it. This auxiliary anode is connected to the priming cathodes of the next device in the circuit so as to impart a priming pulse to those priming cathodes.

Further, it is a feature of one illustrative embodiment of this invention that a gaseous discharge device include a pair of transfer cathodes interposed between the priming and rest cathodes and cooperating therewith. More specifically, it is a feature of this invention that a circuit for both binary addition and subtraction include a plurality of such devices and include also separate pulse input leads for adding and subtracting, the transfer cathodes of each device being selectively connected to these two input leads for addition or subtraction on the application of signal pulses to the counting circuit.

Further, it is a feature of another illustrative embodiment of this invention that a gaseous discharge device include an auxiliary anode adjacent the high efficiency portion of each of the two transfer cathodes in the device, the auxiliary anodes being shielded advantageously from the other elements in the device. More specifically it is a feature of this invention that a circuit include a plurality of such devices with the auxiliary anodes of each device being connected to the priming cathodes of the next device in the circuit so as to impart a priming pulse to those cathodes for binary addition or subtraction on the application of signal pulses to the counting circuit.

Further, it is a feature of this invention that the preference cathodes of these devices may be formed of a single wire wound into a hollow helical section defining the portion of high discharge efficiency and having one end of the wire extending away therefrom defining the portion of low discharge efficiency.

A complete understanding of this invention and of the various features thereof may be gained from consideration of the following detailed description and the accompanying drawing, in which:

Fig. 1 is a schematic depicting one specific illustrative embodiment of this invention wherein a single cold cathode gaseous discharge device in accordance with this invention recognizes the coincidence of two signals or pulses;

Fig. 2 is a schematic representation of another illustrative embodiment of this invention comprising a portion of a simple binary counting chain;

Fig. 8 is a schematic portraying still another illustrative embodiment of this invention comprising a portion of a simple binary counting chain; and Fig. 9 is a schematic showing still another illustrative embodiment of this invention comprising a portion of a reversible binary counting chain.

Figure 3:
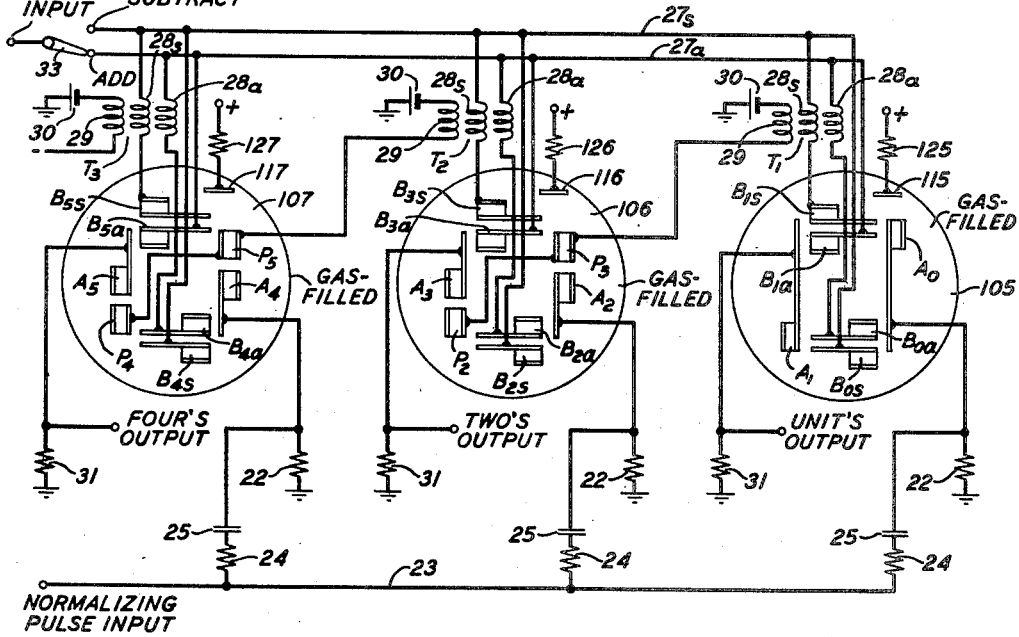
Fig. 3 is a schematic representation of still another illustrative embodiment of this invention comprising a reversible binary counting chain.

Referring now to the drawing, Fig. 1 illustrates one specific embodiment of this invention wherein a coincidence circuit is attained by the combination of cathodes having a preference mechanism, and non-preference cathodes in accordance with this invention. The glow discharge device 10 there depicted comprises a gas filled envelope enclosing an anode 11 and a plurality of cathodes positioned in a specified order opposite the anode 11, which is connected to a positive voltage supply, not shown, through a load resistance 12. The cathodes include a first or normal cathode N to initiate the discharge to the anode 11, a priming cathode P, a transfer cathode B, and a rest or output cathode A. Both the transfer cathode B and rest cathode A have portions of high and low discharge efficiencies, as described in my Patent No. 2,575,370 issued November 20, 1951, and may advantageously be formed as described hereinafter. Such a structure whereby the discharge is concentrated in part of the cathode for preferential transfer to the next cathode adjacent that part is known as a preference mechanism and such cathodes are termed preference cathodes. Thus, the priming cathode P is a non-preference cathode, while each of the transfer and rest cathodes is a preference cathode, the preference mechanism being such that the discharge is transferred preferably in the direction from cathode B to cathode A.

The operation of the device disclosed in Fig. 1 is dependent on the combining of cathodes having preference mechanisms with a simple non-preference cathode to obtain response only to simultaneous signals, so that the device operates as a coincidence circuit. A glow discharge is established in the device to the opposite side of the priming cathode P than the transfer cathode B and in this specific embodiment by applying a large negative normalizing pulse 14 to the normal cathode N. At a later time $t_1$ an input pulse 15 to the priming cathode P will cause a discharge to occur to that cathode. Since this cathode P has no preference mechanism, the release of this pulse at time $t_2$ will allow the discharge to step back to the normal cathode N. This back-step is aided by the negative bias applied to the normal cathode by the battery 13. Then if at a time $t_3$ a negative pulse 16 is applied to the transfer cathode B, it will have no effect, the pulse 16 being insufficient to initiate a discharge to the cathode and there being no discharge present at the prior cathode P for it to transfer.

Now let us consider the conditions beginning at a time $t_4$ when another negative pulse 17 is applied to the priming cathode P. As before, this pulse will cause a transfer of the discharge from cathode N to cathode P. However, before the pulse 17 is removed, causing the discharge to step back to the normal cathode N, a negative pulse 18 is applied to the transfer cathode B. This will cause a breakdown to occur to the transfer cathode B. At time $t_5$, when the pulse 17 applied to the priming cathode is released, the discharge will remain at the transfer cathode B as the pulse 18 applied to it has not been removed. However, on release of that pulse 18 at time $t_6$ the discharge will step to the rest or output cathode A due to the preference mechanisms of the rest and transfer cathodes and a voltage signal 19 will appear at the output terminal. It can be seen that this occurs only when the pulses applied to the priming and transfer cathodes overlap in time. Further, because the transfer cathode is a preference cathode and the priming cathode a non-preference cathode, it is immaterial whether the pulse is first applied to one or the other, so long as at some instant they are coincident, as the combination including the preference mechanisms assures that the discharge will transfer in the proper direction.

Thus, by employing a non-preference priming cathode P in combination with the preference transfer and rest cathodes B and A, respectively, a coincidence circuit is provided for the recognition of the simultaneous occurrence of two signals. Such circuits of and by themselves have many advantageous uses in switching, telephone, and computing systems. They may also be employed in combinations. Fig. 2 represents another specific illustrative embodiment of this invention wherein coincidence circuits in accordance with this invention are employed in combination in a binary stepping chain. Basically in this embodiment of the invention, the stepping chain is a chain of two-stage stepping tubes arranged so that in each tube the discharge steps from one rest cathode to the other and back again. To count in the binary sense the first or "units" tube of the chain steps on each input pulse, the second or "twos" tube steps on every second input pulse, the third or "fours" tube on every fourth pulse and so forth.

The "units" tube 100 is a two-stage stepping tube having an anode 110 and four preference cathodes associated therewith, the cathodes being two rest cathodes $A_0$ and $A_1$ and two transfer cathodes $B_0$ and $B_1$ alternately arranged. The "twos" tube 101 similarly has an anode 111, two rest cathodes $A_2$ and $A_3$ and two transfer cathodes $B_2$ and $B_3$, but has two non-preference priming cathodes $P_2$ and $P_3$ for coincidence operation in accordance with this invention. The "fours" tube also has an anode 112 and rest cathodes $A_4$ and $A_5$, transfer cathodes $B_4$ and $B_5$, and priming cathodes $P_4$ and $P_5$ associated therewith. Tubes in additional stages each also have an anode, two rest, two transfer and two priming cathodes, in accordance with this invention.

The priming cathodes P are advantageously interposed between the high efficiency end of each rest cathode A and the low efficiency portion of each transfer cathode B. The rest cathode A before the priming cathode P thus functions in the coincidence operation as the normal cathode N in the embodiment of this invention shown in Fig. 1.

The anodes 110, 111, 112, etc., of each tube of the counting chain are connected to a positive voltage source, not shown, through individual load resistors, 120, 121, 122, etc. One of the rest cathodes in each tube is connected to ground through a resistance 22 and is coupled to a common normalizing input bus 23 as through a resistance 24 and a capacitance 25. Specifically, rest cathode $A_0$ in the units tube 100, rest cathode $A_2$ in the twos tube 101 and rest cathode $A_4$ in the fours tube 102 are so connected, in this illustrative embodiment. These rest cathodes then also serve as normalizing cathodes for their respective tubes so that operation may be started by applying a single negative normalizing pulse which establishes a glow discharge to each of the rest cathodes $A_0$, $A_2$, $A_4$, etc. This corresponds to "zeroing" the chain. It is to be understood, however, that independent normalizing cathodes may be employed, the discharge on release of the normalizing pulse transferring to these first rest cathodes.

Each of the transfer cathodes in the tubes in the stepping chain is connected to a counting pulse input bus 27. One of the transfer cathodes in each tube is directly connected to the bus but the other is connected to the bus through one side of a transformer. Specifically, in the illustrative embodiment depicted in Fig. 2, transfer cathode $B_0$ of the units tube 100 is connected to the bus through one side 28 of the transformer $T_1$, transfer cathode $B_2$ of twos tube 101 through one side 28 of the transformer $T_2$, transfer cathode $B_4$ through one side 28 of the transformer $T_3$, etc. The other side 29 of these transformers is connected between a grounded negative voltage supply 30 and the priming cathodes P.

The coincidence arrangement in accordance with this invention provides that the priming electrodes $P_2$ and $P_3$ of the twos tube 101 will receive a negative priming pulse only when the discharge is being stepped from the rest cathode $A_1$ to rest cathode $A_0$ by means of the transfer cathode $B_0$ in the units tube 100. Similarly, the priming cathodes $P_4$ and $P_5$ will only receive a priming pulse when the discharge is being stepped from rest cathode $A_3$ to rest cathode $A_2$ by means of the priming cathode $P_2$ and transfer cathode $B_2$, and so forth down the counting chain. This is because the primaries of the transformers $T_1$, $T_2$, $T_3$, etc., are connected only to one transfer cathode in each tube. Thus, when the glow is picked up on that transfer cathode $B_0$, $B_2$, or $B_4$, etc., a voltage appears across the primary of the transformer, which is transferred as a negative pulse to the priming electrodes of the next tube. Coincidence of this negative pulse to the priming electrode and a negative input pulse to the transfer electrodes causes this next tube to step. Hence, stepping only occurs in the twos tube 101 when a priming pulse is applied to the priming electrodes $P_2$ and $P_3$ and a counting input pulse to the transfer electrodes.

The stepping or counting by this specific illustrative circuit embodiment is as follows: a normalizing pulse will initiate a discharge between the rest cathodes $A_0$, $A_2$, $A_4$, etc., and their respective anodes. A counting input pulse applied simultaneously to all the transfer cathodes will then only be effective to transfer the discharge in the units tube 100 from rest cathode $A_0$ to rest cathode $A_1$. A second counting input pulse simultaneously applied to all the transfer cathodes will then transfer the glow in the units tube from rest cathode $A_1$ back to rest cathode $A_0$. However, this transfer is by way of the transfer cathode $B_0$ causing a voltage to appear across the primary of the transformer $T_1$ and thus a pulse on the priming cathodes $P_2$ and $P_3$. Because there will then be the coincidence of a priming pulse on priming electrode $P_3$ and a counting input pulse on the transfer cathode $B_3$, the discharge in the twos tube 101 will transfer from rest cathode $A_2$ to rest cathode $A_3$. A third input pulse is then effective to step the discharge in the units tube again from rest cathode $A_0$ to $A_1$ but has no other effect. A fourth input pulse, however, will again cause the discharge in the units tube to be transferred by transfer cathode $B_0$ thereby giving rise to a priming pulse which is applied to priming electrode $P_2$, and allows the discharge in the twos tube to step from the rest cathode $A_3$ to rest cathode $A_2$. As this stepping is achieved by the transfer cathode $B_2$ a priming pulse is applied to the priming electrodes $P_4$ and $P_5$ of the next stage, thereby allowing the discharge in that stage to transfer from rest cathode $A_4$ to rest cathode $A_5$ because of the coincidence of the priming and input pulse applied to the priming electrode $P_5$ and the transfer electrode $B_5$, respectively. Additional counting steps follow the pattern just described and will not be further set forth.

The rest cathodes $A_1$, $A_3$, $A_5$, etc., of each of the tubes in the chain are connected to ground through a respective resistance 31 and an output terminal is connected to the ungrounded side of each resistance 31. Therefore, when the discharge occurs between the anode and the rest cathodes $A_1$, $A_3$, $A_5$, etc., an output signal occurs. From the above description of the operation of the circuit of Fig. 2 and considering the presence of an output signal to indicate "1" and its absence "0," the counting of the circuit for the three stages shown can be summarized by the following table, wherein the position of the glow discharge in each tube is indicated by * and the generation of a priming pulse in a tube by an arrow:

| Binary Number | Number of Pulses | Position of the Glow In: | | | | | | |
|---|---|---|---|---|---|---|---|---|
| | | Fours Tube | | Twos Tube | | | Units Tube | |
| | | $A_5$ | $A_4$ | Priming pulse | $A_3$ | $A_2$ | Priming pulse | $A_1$ | $A_0$ |
| 000 | Zero | | | | | | | | * |
| 001 | One | | | | | | | * | |
| 010 | Two | | | | | * | | | * |
| 011 | Three | | | | | * | | * | |
| 100 | Four | | * | | | | <— | | * |
| 101 | Five | | * | | | | | * | |
| 110 | Six | | * | | * | | | | * |
| 111 | Seven | | * | | * | | | * | |

It will be noted that transfer of the discharge in a tube at a given stage in the circuit occurs only when a priming pulse is engendered by the tube in the next preceding stage. Therefore, as the priming signal is used in accordance with this invention only to allow breakdown to the transfer or B cathode of the next tube in the chain the full input signal appears across the primary of each transformer. There is thus no degeneration as the number of stages of the counting chain is increased.

The coincidence circuits in accordance with this invention are applicable to other types of counting chains. For example, in Fig. 3 these principles are extended to a counting chain that can add or subtract depending on the setting of a single switch. Referring now to that figure, similar elements to those employed in Fig. 2 have been given the same reference numeral. In these counting chains, however, each tube 105, 106, 107, etc., has two sets of B or transfer cathodes, which are the "a" or add transfer cathodes or the "s" or subtract transfer cathodes. Considering the twos tube 106 as exemplary, the stepping tube comprises a common anode 116 connected to a positive voltage supply, not shown, through a load resistance 126, rest cathodes $A_2$ and $A_3$ and priming cathodes $P_2$ and $P_3$, as in the embodiment of Fig. 2, and two pairs of transfer cathodes $B_{1a}$ and $B_{3a}$ comprising the first pair and $B_{2a}$ and $B_{2s}$ comprising the second pair. The "a" transfer cathodes ($B_{0a}$, $B_{1a}$, $B_{2a}$, etc.) are connected to the add input bus 27a in the same manner as the transfer cathodes of the prior embodiment, one transfer cathode in each stage being connected to the counting pulse input bus through the primary 28a of a transformer. Thus, the prior discussion of the operation of the counting chain when adding is applicable to this embodiment when the input switch 33 is set to contact "Add."

The "s" or subtract transfer cathodes ($B_{0s}$, $B_{1s}$, $B_{2s}$, etc.) are each connected to the subtract input bus 27s but whereas the transfer cathode just subsequent, in the stepping operation of each tube, to the output rest cathode was connected to the input bus through the primary of the transformer for adding, the transfer cathodes just prior to the output rest cathode are here connected to the input bus 27s through the primary of the transformer. Thus in the three stages shown, transfer cathodes $B_{1s}$, $B_{3s}$, and $B_{5s}$, are each connected to the counting pulse input bus 27s through the primary 28s of transformers $T_1$, $T_2$, and $T_3$, respectively. Then when switch 33 is set to the contact "Subtract," priming signals are applied to the twos tube 106 when the discharge is stepped from rest cathode $A_0$ to rest cathode $A_1$ because the transfer cathode $B_{1s}$ connected to the primary 28s of transformer $T_1$ is between them. Similarly, priming signals are applied to the fours tube 107 only when the glow discharge in the twos tube 106 is being stepped from rest cathode $A_2$ to rest cathode $A_3$ by the transfer cathode $B_{3s}$.

By these connections binary subtraction is achieved. Rather than describe the operation of this specific illustrative embodiment as a subtracting counting chain for all the stages shown, as done above with reference to the embodiment of Fig. 2, a single example of subtraction will suffice to explain the operation of this embodiment. The subtracting problem to be considered is, in Arabic numbers, 4—1=3 or in binary numbers 100—1=011. When a condition corresponding to 100, which of course is the binary equivalent of 4, is present in the specific illustrative embodiment of Fig. 3, the glow discharge will be present at the output rest cathode $A_5$ of the fours tube 107 and the rest cathodes $A_2$ and $A_0$ of the twos and units tubes respectively. A pulse appearing on the subtract pulse input bar 27s then causes the discharge in the units tube to step from rest cathode $A_0$ to rest cathode $A_1$ by way of the transfer cathode $B_{1s}$, thereby sending a priming pulse to the priming cathodes of the tube of the next stage. Thus as a priming pulse appears on priming cathode $P_3$, the glow in the twos tube will transfer from rest cathode $A_2$ to rest cathode $A_3$ by way of transfer cathode $B_{3s}$, which in turn again gives rise to a priming pulse which is applied to the fours tube causing the glow there to step from rest cathode $A_5$ to rest cathode $A_4$. Thus after this single pulse the condition in the counting chain will be that the glow is present at the output rest cathodes $A_3$ and $A_1$ of the twos and units tubes, respectively, and at rest cathode $A_4$ of the fours tube. This condition is expressed by the binary expression 011, which is the binary equivalent of 3.

Figure 4:
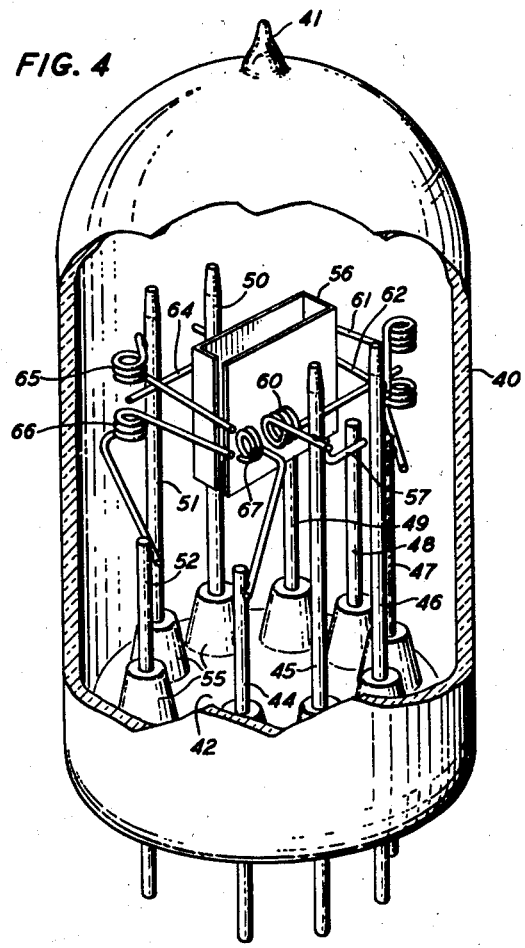
Fig. 4 is a perspective view of a cold cathode gaseous discharge device illustrating one specific illustrative embodiment of this invention for incorporation in the reversible binary counting chain of Fig. 3, a portion of the envelope having been broken away.

Referring now to Fig. 4, there is shown one specific illustrative embodiment of a gaseous discharge device in accordance with this invention which may be incorporated in the reversible binary counting chain shown in Fig. 3. This specific device comprises an envelope 40, as of glass, having an exhaust tubulation 41 at one end and a base 42 at the other end. A plurality of leads 44 through 52 extends through seals 55 in the base 42. A hollow rectangular anode 56 is supported by a short wire support member 57 attached to lead 48. The anode 56 is advantageously so positioned as to be surrounded by the priming cathodes P, transfer cathodes B and rest cathodes A, thereby being capable of sustaining a discharge to each of them. These cathodes include, in order, a rest cathode 60, a first pair of transfer cathodes 61 and 62, a priming cathode 63, a second rest cathode 64, a second pair of transfer cathodes 65 and 66, and a second priming cathode 67. The rest cathode 60 is attached to and supported by lead 45, transfer cathode 61 by lead 47, transfer cathode 62 by lead 47, the priming electrode 63 by lead 49, rest cathode 64 by lead 50, transfer cathode 65 by lead 51, transfer cathode 66 by lead 52, and priming cathode 67 by lead 44.

Figure 6:
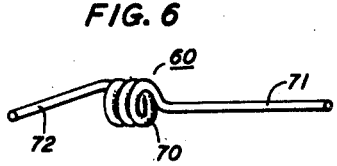
Fig. 6 is a perspective view of a preference cathode employed in the device of Fig. 4.
Figure 7:
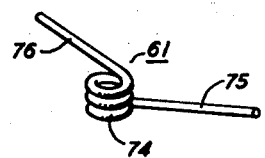
Fig. 7 is a perspective view of another preference cathode employed in the device of Fig. 4.

Each of the rest and transfer cathodes advantageously has a portion of high glow discharge efficiency and a portion of low glow discharge efficiency, as described in my Patent No. 2,575,370 issued November 20, 1951, thereby comprising a preference mechanism for the stepping of the glow discharge. However, the two priming cathodes are non-preference cathodes, advantageously being similar to the high efficiency discharge portions of the preference cathodes. In this specific illustrative embodiment of this invention each of the cathodes is formed from a single wire, the high efficiency discharge portions being provided by winding the wire into a closed helix, thereby providing a hollow cathode, and the low efficiency portions are formed by one end of the wire extending from that helix. Thus Fig. 6 shows a perspective view of the preference transfer cathode 60 which comprises the close wound hollow portion 70 and one end 71 of the wire providing the low efficiency discharge portion; the other end 72 of the wire serves to attach the cathode to the lead 45. Similarly, Fig. 7 shows a perspective view of the preference transfer cathode 61 and comprises a closed hollow portion 74 and one end 75 of the wire which serves as the low discharge efficiency portion; the other end 76 serves to attach the cathode to the lead 46.

Referring now back to Fig. 4, it can be seen that the cathodes are so mounted that the low efficiency discharge portion 71 of the rest cathode 60 extends between the high efficiency portions of the two transfer cathodes 61 and 62 immediately preceding it considering the direction of stepping. Thus transfer to the rest cathode 60 can be initiated equally by either of the pair of transfer cathodes. Similarly the priming cathode 67 directly adjacent the other side of the high efficiency portion 70 of rest cathode 60 is positioned opposite each of the low efficiency portions of the next pair of alternate transfer cathodes 65 and 66 so that transfer from rest cathode 60 to rest cathode 64 by the coincidence of signals to both the priming cathode 67 and one of the pairs of transfer cathodes 65 and 66 can occur, in accordance with this invention, equally for either of the pair of transfer cathodes 65 and 66.

Figure 5:
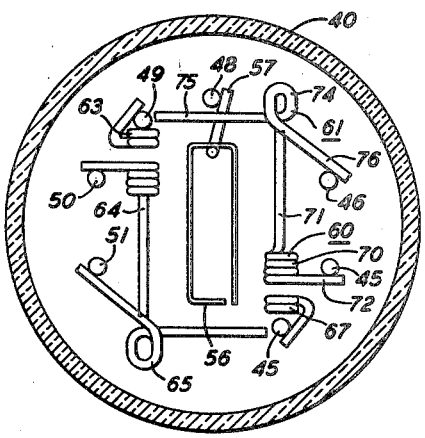
Fig. 5 is a plan view of the illustrative embodiment of Fig. 4.

In one specific illustrative embodiment of a gaseous discharge device as shown in Figs. 4 and 5, the cathodes were formed by bending molybdenum wire into the helical and straight sections, the anode was of molybdenum, and the tube was filled with neon at a pressure of 50 millimeters of mercury. With one such device, which of course is merely exemplary of this invention, I have found that when incorporated into the circuits of either Fig. 2 or Fig. 3 when a glow discharge is present at one rest cathode and a slight positive bias, as of 5 volts, is present on the priming electrodes, a very large negative signal, as of the order of 40 volts or more, is required to transfer the glow to the next rest cathode. However, when a discharge is present on the priming cathodes, a coincident small negative pulse, as of the order of 6 volts, is sufficient to transfer the discharge to the next rest cathode. Hence in accordance with this invention, even a large negative pulse, as of the order of 15 or 20 volts, applied to the transfer cathode would not cause a transfer from the precedent to the subsequent rest cathode unless it was coincident with a negative pulse to the intermediate priming cathode.

In the embodiments of this invention described above the priming pulse is delivered to the priming cathode by the discharge at a particular transfer cathode in the preceding device through a transformer. However, the priming pulse may be generated in other ways. In Figs. 8 and 9, there are there shown specific embodiments wherein the priming pulse is delivered to the priming cathodes by an auxiliary anode positioned adjacent a particular transfer cathode in the preceding device in the counting circuit and advantageously shielded so as to be capable of readily sustaining a discharge with that transfer cathode alone. Fig. 8 shows a simple binary counting circuit in accordance with this specific illustrative embodiment of this invention and Fig. 9 shows a reversible binary counting circuit in accordance with this embodiment wherein either binary addition or subtraction may be attained depending on the determination of a single switch.

Referring now to Fig. 8, elements of the discharge devices and circuit elements identical with those of prior embodiments have been indicated by the same reference numerals and will not be again referred to. In this specific illustrative embodiment, however, the two transfer cathodes of each device are electrically connected together and are directly connected to the counting pulse input bus 27. An auxiliary anode X is positioned advantageously adjacent the high efficiency portion of the transfer cathode that, in the illustrative embodiment shown in Fig. 1, was connected to the primary of the transformer. Thus in the units device 1000 an auxiliary anode $X_0$ is positioned adjacent the transfer cathode $B_0$, in the twos device 1001 an auxiliary anode $X_2$ is positioned adjacent the transfer cathode $B_2$, in the fours device 1002 an auxiliary anode $X_4$ is positioned adjacent the transfer cathode $B_4$, etc. Advantageously each of these auxiliary anodes has a shield member 79 positioned adjacent to it to insure that, while the main anodes 1100, 1101, 1102, etc., are capable of maintaining a discharge between themselves and all of the cathodes within the device, the auxiliary anode can only readily maintain a discharge between itself and the transfer cathode adjacent to it. The auxiliary cathodes are each connected to a positive voltage source, not shown, through a high resistance 80 and to one side of a capacitance 81. The other side of the capacitance 81 is connected to the priming cathodes of the next device and also to ground through a lower resistance 82. Advantageously the resistance 80 may be of the order of a megohm and resistance 82 of the order of 10,000 ohms.

When the discharge in the units device 1000 is transferred from the rest cathode $A_1$ to the rest cathode $A_0$ by way of the transfer cathode $B_0$, a discharge occurs at the transfer cathode $B_0$. As the auxiliary anode $X_0$ is biased by the voltage supply, not shown, above the sustaining voltage but below the breakdown voltage of the gap between itself and the transfer cathode $B_0$, the appearance of the discharge at $B_0$ will cause a discharge also to occur between $B_0$ and $X_0$. As soon as this discharge is initiated the voltage of the auxiliary anode $X_0$ will drop from the original bias voltage of the voltage source, not shown, to the voltage of the transfer cathode $B_0$ plus the sustaining voltage of the discharge between them. For purposes of illustration we can consider that the original voltage bias is 200 volts, the counting pulse, which is the voltage of the transfer cathode $B_0$, is —10 volts, and the sustaining voltage of the discharge 100 volts. The voltage of the auxiliary anode will thus instantaneously change from 200 volts to 90 volts. This will also change the voltage bias on the priming cathodes $P_1$ and $P_2$ by 110 volts or cause a negative pulse of 110 volts to be applied to the priming cathodes. This voltage drop occurs on the priming cathodes because the condenser 81 cannot instantaneously charge up so that the full negative voltage pulse is applied to the priming cathodes. The operation of the coincidence circuit of the priming and transfer cathodes in transferring the discharge only when such a pulse is applied to the priming cathodes and a pulse is applied to the transfer cathodes is the same as that described above.

Referring now to Fig. 9, the specific illustrative embodiment of this invention there shown comprises a reversible binary counting circuit capable of either addition or subtraction. In this embodiment only two transfer cathodes are employed in each device, as in the embodiment of Fig. 8, but an auxiliary anode is positioned adjacent each of the transfer cathodes. The auxiliary anodes are each connected to the priming cathodes of the next succeeding device through condensers 81a or 81s, the condensers being shown as grounded through a coil 84 rather than through a resistance 82. The counting circuit will add or subtract depending on whether the positive voltage bias is applied to the add auxiliary anodes $X_0$, $X_2$, $X_4$, etc., or to the subtract auxiliary anodes $X_1$, $X_3$, $X_5$, etc., which is controlled by a single switch 86 between the voltage source, not shown, and the subtract bus 85s or the add bus 85a. The operation of the auxiliary anodes in priming the priming cathodes of the succeeding devices is the same as described with reference to Fig. 8 and the operation of the coincidence circuit, in accordance with this invention, in attaining subtraction is the same as that described with reference to Fig. 3 above.

It is to be understood that the above-described arrangements are illustrative of the application of the principles of the invention. Numerous other arrangements may be devised by those skilled in the art without departing from the spirit and scope of the invention.

What is claimed is:

1. A gaseous discharge device comprising an anode and a plurality of cathodes opposite said anode, said cathodes including a first cathode for establishing a discharge to said anode, a non-preference priming cathode, a preference transfer cathode, and a preference rest cathode, said priming and transfer cathodes being positioned between said first and rest cathodes, whereby said discharge is transferred from said first cathode to said rest cathode on the coincidence of signals on said priming and transfer cathodes.

2. A gaseous discharge device comprising an anode and a plurality of cathodes opposite said anode, said cathodes including a first cathode, a priming cathode, a transfer cathode, and a rest cathode positioned in order, said priming cathode being a non-preference cathode and said rest and transfer cathodes being preference cathodes whereby said discharge is transferred from said first cathode to said rest cathode on the coincidence of signals on said priming and transfer cathodes.

3. A gaseous discharge device comprising an anode, a first cathode cooperating with said anode for establishing a discharge therebetween, a priming cathode, a transfer cathode, and a rest cathode opposite said anode and arranged in the order stated from said first cathode, said transfer and rest cathodes having portions of high and low discharge efficiency, said low efficiency portions being adjacent the preceding cathode, and said priming cathode having only a single discharge efficiency.

4. Circuit means comprising a gaseous discharge device comprising an anode, a plurality of cathodes opposite said anode, said cathodes including a first cathode, a priming cathode, a transfer cathode, and a rest cathode positioned in that order, said rest and transfer cathodes having portions of high and low discharge efficiency, each low efficiency portion being adjacent the preceding cathode, and said priming cathode having only a portion of high discharge efficiency, means for establishing a discharge between said anode and said first cathode, and means for applying signals independently to said priming and transfer cathodes whereby said discharge transfers to said rest electrode only on the coincidence of signals to said priming and transfer cathodes.

5. Circuit means comprising a gaseous discharge device comprising an anode, a first cathode opposite said anode, and a preference rest cathode opposite said anode, means for establishing a discharge between said anode and said first cathode and means for transferring said discharge to said rest cathode, said last-mentioned means including a non-preference priming cathode and a preference transfer cathode positioned in that order between said first and rest cathodes and means for applying signals independently to said priming and transfer cathodes whereby said discharge transfers to said rest cathode only on the coincidence of signals to said priming and transfer cathodes.

6. Circuit means comprising a first gaseous discharge device having a pair of rest and a pair of transfer cathodes alternately arranged and an anode associated therewith and at least one other gaseous discharge device having a pair of priming, a pair of transfer and a pair of rest cathodes arranged therein and an anode associated therewith, means for establishing gaseous discharges within said devices, means for applying pulses to said transfer cathodes, and means for applying pulses to said priming cathodes upon the transfer of the discharge in said first device by one of the transfer cathodes therein, whereby the discharge transfers in said other device only upon the coincidence of pulses to the transfer and priming cathodes therein.

7. Circuit means in accordance with claim 6 wherein said rest and transfer cathodes have portions of high and low discharge efficiency, said low efficiency portions being adjacent the high efficiency portion of the preceding cathode, and said priming cathodes have only a portion of a single discharge efficiency.

8. Circuit means comprising a first gaseous discharge having a pair of preference rest and a pair of preference transfer cathodes alternately arranged and an anode associated therewith and at least one other gaseous discharge device having a pair of non-preference priming, a pair of preference transfer, and a pair of preference rest cathodes arranged therein in that order and an anode associated therewith, means for establishing gaseous discharges in said devices, means for applying pulses to said transfer cathodes, and means for applying pulses to said priming cathodes upon the transfer of the discharge in said first device by a particular one of the transfer cathodes of said first device, whereby the discharge transfers in said other device only upon the coincidence of pulses to the transfer and priming cathodes therein.

9. A circuit for binary counting comprising a plurality of gaseous discharge devices, said devices including a first device having a pair of transfer and a pair of rest cathodes alternately arranged to form a closed stepping chain and an anode associated therewith and each of the other devices having a pair of priming, a pair of transfer, and a pair of rest cathodes singly arranged in that order to form a closed stepping chain and an anode associated therewith, means for establishing a gaseous discharge within each of said devices, means for applying pulses to said transfer cathodes including a pulse input lead to which each of said cathodes is connected, means for applying pulses to the priming cathodes of one of said other devices upon the transfer of the discharge in the preceding device by one of the transfer cathodes therein, whereby the discharge transfers in said one device upon the coincidence of pulses to the transfer and priming cathodes therein, and output means associated with one of said rest cathodes in each of said devices.

10. A circuit for binary counting in accordance with claim 9 wherein each of said rest and transfer cathodes has a portion of high and a portion of low discharge efficiency, said low efficiency portion being adjacent the high efficiency portion of the preceding cathode, and said priming cathodes have only a portion of high discharge efficiency.

11. A circuit for binary counting in accordance with claim 10 wherein said means for applying pulses to the priming cathodes includes a plurality of transformers, one of each of said transfer cathodes in each of said devices being directly connected to said pulse input lead and the other of said transfer cathodes in each of said devices being connected to said pulse input lead through one side of one of said transformers, the priming cathodes of the succeeding device being connected to the other side of said transformer.

12. A circuit for binary counting in accordance with claim 11 wherein in each of said devices the transfer cathode connected directly to said input pulse lead is positioned with its high discharge efficiency portion adjacent the low discharge efficiency portion of the rest cathode having output means associated therewith, whereby said circuit accomplishes binary addition.

13. A circuit for binary counting in accordance with claim 11 wherein in each of said devices the transfer cathode connected to said input pulse lead through the one side of a transformer is positioned with its high discharge efficiency portion adjacent the low discharge efficiency portion of the rest cathode having output means associated therewith, whereby said circuit accomplishes binary subtraction.

14. A circuit for binary counting in accordance with claim 10 wherein said means for applying pulses to the priming cathodes includes an auxiliary anode positioned adjacent one of said transfer cathodes and cooperating therewith, means for applying to said auxiliary anode a positive voltage bias greater than the sustaining voltage between said auxiliary anode and said transfer cathode cooperating therewith, and means electrically connecting said auxiliary anode to the priming cathodes of the next succeeding device for applying a negative voltage pulse to said priming cathodes on the occurrence of a discharge between said auxiliary anode and said transfer cathode cooperating therewith.

15. A circuit for binary counting comprising a plurality of gaseous discharge devices, said devices including a first device having a first rest cathode, a first pair of transfer cathodes, a second rest cathode, and a second pair of transfer cathodes arranged therein in that order forming a closed array and an anode associated therewith and each of the other devices having a first priming cathode, a first pair of transfer cathodes, a first rest cathode, a second priming cathode, a second pair of transfer cathodes, and a second rest cathode arranged therein in that order forming a closed array and an anode associated therewith, means for establishing a discharge in each of said devices between one of the rest cathodes and the anode of that device, output means associated with the other of the rest cathodes in each of said devices, a plurality of transformers, and means for applying pulses to said transfer cathodes comprising a first pulse input lead, one each of said first pairs of transfer cathodes being directly connected to said first lead and one each of said second pairs of transfer cathodes being connected to said first lead through a first primary winding of one of said transformers, and a second pulse input lead, the other of said second pairs of transfer cathodes being directly connected to said second lead and the other of said first pairs of transfer cathodes being connected to said second lead through a second primary winding of said one of said transformers, the secondary of each of said transformers being connected to the priming cathodes of the succeeding device, whereby transfer of the discharge in the preceding device by a transfer cathode connected to a primary winding causes a priming pulse to be applied to the priming cathodes of the succeeding devices.

16. A circuit for binary counting in accordance with claim 15 wherein each of said rest and transfer cathodes has a portion of high and a portion of low discharge efficiency and said priming cathodes have only a portion of high discharge efficiency, said low efficiency portions being adjacent the high efficiency portion of the preceding cathodes in the stepping chain.

17. A circuit for binary counting in accordance with claim 16 wherein in each of said devices the transfer cathode connected directly to said first lead is positioned with its high discharge efficiency portion adjacent the low discharge efficiency portion of the rest cathode having output means associated therewith whereby binary addition is accomplished and the transfer cathode connected directly to said second lead is positioned with its high efficiency portion adjacent the low efficiency portion of the other of the rest cathodes in each of said devices whereby binary subtraction is accomplished.

18. A circuit for binary counting comprising a plurality of gaseous discharge devices, said devices including a first device having a pair of transfer and a pair of rest cathodes alternately arranged to form a closed stepping chain and an anode associated therewith and each of the other devices having a pair of priming, a pair of transfer, and a pair of rest cathodes singly arranged in that order to form a closed stepping chain and an anode associated therewith, an auxiliary anode adjacent one of said transfer cathodes in each of said devices and cooperating therewith, means within said devices shielding said anode from the other elements within said device, means for establishing a gaseous discharge within each of said devices, means for applying pulses to said transfer cathodes including a pulse input lead to which each of said cathodes is connected, means applying to said auxiliary anodes a positive voltage bias greater than the sustaining voltage between said auxiliary anode and said transfer cathode cooperating therewith including a high resistance, means including a capacitance electrically connecting said auxiliary anodes and the priming cathodes of the next succeeding devices for applying pulses to the priming cathodes of said devices upon the transfer of the discharge in the preceding device by the transfer cathode adjacent said auxiliary anode and cooperating therewith, whereby the discharge transfers in the device upon the coincidence of pulses to the transfer and priming cathodes therein, and output means associated with one of said rest cathodes in each of said devices.

19. A circuit for binary counting comprising a plurality of gaseous discharge devices, said devices including a first device having a pair of transfer and a pair of rest cathodes alternately arranged to form a closed stepping chain and an anode associated therewith and each of the other devices having a pair of priming, a pair of transfer, and a pair of rest cathodes singly arranged in that order to form a closed stepping chain and an anode associated therewith, said rest and transfer cathodes having each a portion of high and a portion of low discharge efficiency, said low efficiency portion being adjacent the high efficiency portion of the preceding cathode, and said priming cathodes having only a portion of high discharge efficiency, an auxiliary anode adjacent each of said transfer cathodes in each of said devices and cooperating exclusively therewith, means for establishing a gaseous discharge within each of said devices, means for applying pulses to said transfer cathodes including a pulse input lead to which each of said transfer cathodes is connected, output means associated with one of said rest cathodes in each of said devices, means for alternatively applying a positive voltage bias to said auxiliary anodes cooperating with said transfer cathodes positioned with their high discharge efficiency portion towards the low discharge efficiency portion of the rest cathode having output means associated therewith to attain binary subtraction or to said auxiliary anodes cooperating with said transfer cathodes positioned with their high discharge efficiency portion towards the low discharge efficiency portion of the rest cathode having output means associated therewith to attain binary addition, said voltage bias being greater than the sustaining voltage between the auxiliary anode and the transfer cathode cooperating therewith, and means electrically connecting the auxiliary anodes of one device to the priming cathodes of the next succeeding device for applying pulses to said priming cathodes upon the transfer of the discharge in the preceding device whereby the discharge transfers in the device upon the coincidence of pulses to the transfer and priming cathodes therein.

20. A gaseous discharge device comprising an envelope, an anode positioned within said envelope, and a plurality of cathodes opposite said anode and cooperating therewith, said cathodes forming a closed array and including a first priming cathode, a first transfer cathode, a first rest cathode, a second priming cathode, a second transfer cathode and a second rest cathode arranged in the order named.

21. A gaseous discharge device in accordance with claim 20 wherein each of said rest and transfer cathodes has portions of high and low discharge efficiency and said priming cathodes have portions of a single discharge efficiency only.

22. A gaseous discharge device in accordance with claim 21 wherein each of said rest and transfer cathodes comprises a wire having a tightly wound helical section defining said portion of high discharge efficiency and an end extending therefrom defining said portion of low discharge efficiency.

23. A gaseous discharge device in accordance with claim 21 comprising an auxiliary anode adjacent one of said transfer cathodes and cooperating exclusively therewith.

24. A gaseous discharge device in accordance with cliam 21 comprising an auxiliary anode adjacent each of said transfer cathodes and means shielding said auxiliary anode from the other elements of said device.

25. A gaseous discharge device comprising an envelope, an anode located within said envelope, and a plurality of cathodes opposite and cooperating with said anode, said cathodes including a first rest cathode, a first priming cathode, a first pair of transfer cathodes, a second rest cathode, a second priming cathode and a second pair of transfer cathodes, arranged to form a continuous stepping chain.

26. A gaseous discharge device in accordance with claim 25 wherein each of said rest and transfer cathodes has portions of high and low discharge efficiency and said priming cathodes have only portions of a single discharge efficiency, the low discharge efficiency portions of said rest cathodes being adjacent the high efficiency portions of both of the preceding transfer cathodes in said stepping chain and the low efficiency portions of said transfer cathodes being both adjacent the preceding priming cathode in said chain.

27. A gaseous discharge device in accordance with claim 26 wherein each of said rest and transfer cathodes comprises a wire having a tightly wound helical section defining a portion of high discharge efficiency and an end extending therefrom defining a portion of low discharge efficiency.

28. A cathode for gaseous discharge devices comprising a single wire wound into a hollow helical section defining a portion of high discharge efficiency and having one end extending away thereform defining a portion of low discharge efficiency.

29. A gaseous discharge device comprising an envelope, a plurality of leads extending through said envelope, a rectangular anode positioned within said envelope and supported by one of said leads, and a plurality of cathodes each supported by one of said leads and surrounding said anode, said cathodes including a first rest cathode, a first priming cathode, a first pair of transfer cathodes, a second rest cathode, a second priming cathode, and a second pair of transfer cathodes arranged in that order to form a continuous stepping chain, each of said rest and transfer cathodes having portions of high and low discharge efficiency and said priming cathodes having a portion of high discharge efficiency only, the low discharge efficiency portion of each rest cathode extending between the high efficiency portions of the preceding pair of transfer cathodes in said chain and the low efficiency portions of each of said pairs of transfer cathodes extending adjacent the preceding priming cathode in said chain.

MARK A. TOWNSEND.

No references cited.